US012662189B2

(12) United States Patent
Ein Waldt et al.

(10) Patent No.: US 12,662,189 B2
(45) Date of Patent: Jun. 23, 2026

(54) STEERING WHEEL ACTUATOR APPARATUS FOR STEER-BY-WIRE STEERING SYSTEMS OF A VEHICLE AND RELATED METHODS

(71) Applicant: Ford Global Technologies, LLC, Dearborn, MI (US)

(72) Inventors: Alexander Ein Waldt, Cologne (DE); Oliver Nehls, Düsseldorf (DE); Martin Robert Kopiniok, Vettweiß (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/810,067

(22) Filed: Aug. 20, 2024

(65) Prior Publication Data

US 2025/0065947 A1 Feb. 27, 2025

(30) Foreign Application Priority Data

Aug. 25, 2023 (DE) .......................... 102023122853.6

(51) Int. Cl.
| | |
|---|---|
| *B62D 6/00* | (2006.01) |
| *B62D 5/00* | (2006.01) |
| *B62D 15/02* | (2006.01) |

(52) U.S. Cl.
CPC ............. *B62D 6/008* (2013.01); *B62D 5/006* (2013.01); *B62D 15/0215* (2013.01)

(58) Field of Classification Search
CPC .... B62D 6/008; B62D 5/006; B62D 15/0215; B62D 5/001; B62D 5/003; B62D 5/0481; B62D 5/046; B60R 16/03; B60R 16/033
See application file for complete search history.

(56) References Cited

U.S. PATENT DOCUMENTS

| | | |
|---|---|---|
| 2002/0005315 A1 | 1/2002 | Kind et al. |
| 2014/0252998 A1 | 9/2014 | Rutkowski |

(Continued)

FOREIGN PATENT DOCUMENTS

| | | |
|---|---|---|
| DE | 10053335 A1 | 5/2002 |
| DE | 202014100980 U1 | 4/2014 |

(Continued)

OTHER PUBLICATIONS

German Patent and Trademark Office, "Search Report," issued in connection with German Patent Application No. 102023122853.6, mailed on May 6, 2024, 14 pages.

*Primary Examiner* — Long T Tran
*Assistant Examiner* — Charles J Brauch
(74) *Attorney, Agent, or Firm* — Lorne Forsythe; Hanley, Flight & Zimmerman, LLC

(57) ABSTRACT

Example steering wheel actuator device for a steer-by-wire steering system of a vehicle are disclosed herein. An example steering wheel actuator device includes at least one steering wheel angle measuring device to measure a steering wheel angle of a steering wheel, a motor device to generate a motor torque counteracting a driver torque applied to the steering wheel, a control device, and an electrical energy source that supplies the steering wheel actuator device with electrical energy. The actuator device has an electrical energy storage device is configured to supply at least one steering wheel angle measuring device with stored electrical energy if the steering wheel actuator device is not supplied with electrical energy by the electrical energy source. The electrical energy storage device can preferably be charged with electrical energy generated by the motor device if the applied driver torque surpasses the motor torque.

18 Claims, 7 Drawing Sheets

(56)                References Cited

U.S. PATENT DOCUMENTS

| | | | |
|---|---|---|---|
| 2019/0016376 A1* | 1/2019 | Sjenar .................. | B62D 5/0481 |
| 2019/0346287 A1* | 11/2019 | Koike .................... | G01D 5/245 |
| 2020/0339186 A1* | 10/2020 | Tamaizumi .......... | B62D 5/0469 |
| 2020/0406954 A1 | 12/2020 | Szepessy | |
| 2021/0253157 A1 | 8/2021 | Botond | |

FOREIGN PATENT DOCUMENTS

| | | |
|---|---|---|
| DE | 102018200590 A1 | 3/2019 |
| DE | 102018201221 A1 | 6/2019 |
| DE | 102018106872 A1 | 9/2019 |
| DE | 102018114988 A1 | 12/2019 |
| DE | 102020116876 A1 | 12/2021 |
| DE | 102022103808 A1 | 8/2023 |
| WO | 2019081224 A1 | 5/2019 |
| WO | 2019179859 A1 | 9/2019 |
| WO | 2019243300 A1 | 12/2019 |

* cited by examiner

700

STEERING WHEEL ACTUATOR APPARATUS FOR STEER-BY-WIRE STEERING SYSTEMS OF A VEHICLE AND RELATED METHODS

The present invention relates to steer-by-wire steering systems and, more specifically, to steering wheel actuator apparatus for steer-by-wire steering systems of a vehicle and related methods.

To control a vehicle, a driver changes alignment of steerable wheels of the vehicle that are in contact with the roadway. To do this, the driver uses a steering wheel, of which the change in the steering angle or rotational angle is translated into a change in the angle of the steered wheels in relation to the road. A mechanical connection can be established for this purpose between the steering wheel operated by the driver and the steered wheels of the vehicle (e.g., via, for example, a steering column and a steering shaft). Conversely, a steer-by-wire steering system captures a steering command or corresponding steering angle information with one or more sensors (e.g., at least one steering wheel angle sensor), and transmits this command exclusively via an electrical connection (e.g., via one or more control devices) to an electromechanical actuator that executes the steering command and modifies the alignment of the steered wheels accordingly. To do this, a steer-by-wire steering system has a feedback actuator device (e.g., a steering wheel actuator device) connected to a steering wheel of the vehicle and a road wheel actuator device (e.g., an axle actuator device) that is electrically connected to the steering wheel actuator device and which controls the angles of the steered wheels in relation to the road. The steering wheel actuator device measures the steering wheel angle set by the driver and generates a motor torque suitable for the current driving situation by a motor (e.g., a feedback torque for the driver which counteracts the driver torque applied by the driver to the steering wheel). The axle actuator device moves the steered wheels to the required position by another motor.

It is desirable to ensure an uninterrupted availability of the control function of a steer-by-wire steering system. Unavailability of the control of the motor of the steering wheel actuator device can have the effect that driver torque is no longer generated, so that the driver can turn the steering wheel in some instances more or less force-free. In some instances, turning the steering wheel force-free can inadvertently cause substantial steering wheel angle changes that can lead to unwanted substantial setting angles of the steered wheels of the vehicle if a damping is not effected through suitable design of the steering wheel actuator device when a state of this type is detected.

Steer-by-wire steering systems can therefore provide redundant components such as, for example, the use of a plurality of sensors for angle measurement, a plurality of steering wheel actuator devices, a plurality of axle actuator devices or, in particular, the use of a plurality of external sources of electrical energy to which the steering wheel actuator device and/or the axle actuator device are connected.

DE 100 53 335 A1 describes a steer-by-wire steering system for vehicles in which all essential devices are provided multiple times. The power supply of the system also provides the connection to a plurality of batteries.

US 2002/0005315 A1 describes a steering wheel system which supports steer-by-wire operation and provides an additional damping of the steering wheel movements if the steering wheel actuator fails.

WO 2019/179859 A1 describes a steer-by-wire steering system in which the steering wheel actuator device and the axle actuator device are jointly connected to two redundant power sources.

WO 2019/243300 A1 presents a steer-by-wire steering system in which the axle actuator is connected to two redundant power sources, where the feedback actuator is similarly connected to one of the power sources and the system additionally has a further steering angle sensor which is connected to the other power source.

DE 20 2014 100 980 U1 describes a drive system in which a DC motor is switched to a short circuit state in response to a sudden power failure to generate a resistive torque, where short-circuit transistors that are used are supplied with power from an auxiliary power supply.

Some examples disclosed herein employ a steering wheel actuator device for a steer-by-wire steering system of a vehicle, a steer-by-wire steering system for a vehicle, a vehicle, and/or a method for operating a steering wheel actuator device for a steer-by-wire steering system of a vehicle.

Some examples disclosed herein include a steering wheel actuator device for a steer-by-wire steering system of a vehicle having at least one steering wheel angle measuring device to measure a steering wheel angle of a steering wheel, a motor device to generate a motor torque counteracting a driver torque applied to the steering wheel, and a control device. The steering wheel actuator device is connectable to an electrical energy source which supplies the steering wheel actuator device with electrical energy at least during normal operation. In some examples, the steering wheel actuator device further has an electrical energy storage device which is chargeable up to a limit value and is configured to supply at least the at least one steering wheel angle measuring device with stored electrical energy if the steering wheel actuator device is not supplied with electrical energy by the electrical energy source during aberrant operation.

A steering wheel angle is an angle of rotation through which the steering wheel is turned by the driver around its axis of rotation. A steering wheel angle measuring device has a steering wheel angle sensor and any control circuits that may be required. A motor device includes a motor, for example a DC motor, which is preferably designed as brushless due to the lower mechanical friction, and one or more switch modules to switch the individual phases of the motor. The switch modules include activatable semiconductor switching elements, for example field effect transistors and/or thyristors. The control device, which can, for example, be a programmable device (e.g., a processor or microcontroller) transmits activation signals to the switch modules to control the present operating state of the motor. Depending on the example of the steering wheel angle measuring device, some example control devices disclosed herein can receive steering wheel angle signals from the steering wheel angle measuring device, process the signals and transmit the signals or associated steering commands to the axle actuator device.

An electrical energy source is a current source or a voltage source, for example, a vehicle battery, and is provided to supply at least the steering wheel actuator device with electrical energy during normal operation (e.g., during fault-free, routine operation). Aberrant operation occurs if the electrical energy source is disconnected, switched off or disrupted so that it cannot supply the steering wheel actuator device with electrical energy as normally provided.

For this aberrant operation, the steering wheel actuator device is equipped with a dedicated, internal energy storage device that includes, for example, a storage capacitor and which at least enables at least one steering wheel angle measuring device to be supplied with stored electrical energy, even if the (main) electrical energy source is not available. This at least ensures that the steering wheel angle continues to be measured. If only the measurement of the steering wheel angle is ensured, the steering wheel angle measuring device transmits the steering wheel angle or the steering command associated therewith directly to the axle actuator device. The electrical energy storage device is chargeable up to a limit value which, when reached, ensures that enough energy is available for at least temporary continued operation of at least the steering wheel angle measuring device. The limit value can be a maximum value (e.g., a maximum storable quantity of electrical energy).

In this way, the steering can continue to operate if the energy source actually provided during normal operation is lost, where the size of the electrical energy storage device can be chosen as small, if the energy is intended to be enough, for example, to stop the vehicle.

In one example, the steering wheel actuator device is configured in such a way that the electrical energy storage device at least also supplies the control device with stored electrical energy during aberrant operation. In this example, the steering wheel angle measuring device is supplied with energy by the control device. The electrical energy storage device can also supply the control device with electrical energy to ensure at least the continuation of the steering angle measurement.

In a further example of the steering wheel actuator device, the motor device is configured to generate electrical energy if, in a generator operating state, an applied driver torque surpasses a motor torque (i.e., counteracts and exceeds it in terms of amount). In this way, electrical energy can be generated in the steering wheel actuator device regardless of the availability of the external electrical energy source. The generator operating state is one of a plurality of possible operating states of the motor device and can be adopted during both the normal and aberrant operation of the steering wheel actuator device. During the normal operation of the steering wheel actuator device, in which the external electrical energy source is also available, the motor device can operate in the electric motor operating state in which the applied driver torque does not surpass the motor torque, so that electrical energy is consumed. The internal electrical energy storage device does not permanently enable normal operation of the steering wheel actuator device even if the external electrical energy source is not available. During aberrant operation of the steering wheel actuator device, an operating state of the motor device can further be available in which the possible steering wheel movement is damped.

In one example, the steering wheel actuator device is configured to store electrical energy generated in the generator operating state at least partially in the electrical energy storage device if the state of charge of said electrical energy storage device is below the limit value. In other words, the electrical energy storage device can be charged in this way by steering movements (i.e., rotations of the steering wheel by the driver) during aberrant operation. Even if the steering is de-energized and no longer ready for operation, it can be restarted and made ready for operation by turning the steering wheel. The state of charge of the electrical energy storage device is a parameter which represents either an absolute indication or a relative indication (e.g., a percentage share of the total storage capacity defined by the limit value).

It is provided that the energy store is prevented from being overcharged, for example, by a protective circuit associated with the energy storage device.

In a further example, the steering wheel actuator device stores electrical energy from the electrical energy source at least partially in the electrical energy storage device during normal operation if the state of charge of the electrical energy storage device is below a limit value. In addition, or as an alternative to charging the electrical energy storage device through rotational movements of the steering wheel, the internal electrical energy storage device of the steering wheel actuator device is charged by the external electrical energy source if the latter is available during normal operation.

In one example of the steering wheel actuator device, the electrical energy storage device includes a storage capacitor. Alternatively, the electrical energy storage device can, for example, be a rechargeable battery (e.g., a lithium-ion battery).

In one example of the steering wheel actuator device, the motor device is configured to switch to a phase short-circuit operating state at least during aberrant operation if the state of charge of the electrical energy storage device reaches the limit value. This can be the case, for example, if the electrical energy storage device is charged to a maximum level. In the phase short-circuit operating state, the phases of the motor are short-circuited by switch modules including semiconductor switching elements so that the motor acts as an electromagnetic brake if the driver moves the steering wheel. Steering wheel movement can be damped. Generated energy can be dissipated as heat. The semiconductor switching elements of the switch modules of the motor device can be configured to switch to the phase short-circuit operating state as a result of control signals received from the control device or in the event of loss of all control signals.

Since electrical energy is consumed in the phase short-circuit operating state at least for generating the control signals and for operating the steering wheel angle measuring device, the state of charge of the electrical energy storage device changes slowly and falls below the limit value. It can then be provided to revert to the generator operating state and recharge the electrical energy storage device until the limit value is reached once more. Overcharging of the energy storage device can be avoided and a discharge of the energy storage device can simultaneously be prevented so that the steering function remains available. In some examples in which the control device is kept ready for operation, the control device is configured, after switching back from the phase short-circuit operating state, to adapt the motor torque generated in the generator operating state to the damping torque last generated in the phase short-circuit operating state. This offers the advantage that the perceptibility of the change of operating states is reduced for the driver.

In a further example, the semiconductor switching elements of the motor device can switch directly to the phase short-circuit operating state if the electrical energy supply becomes unavailable. This is advantageous, particularly in an alternative example of the steering wheel actuator device in which the motor device is configured to switch to a phase short-circuit operating state during aberrant operation and to generate electrical energy if the applied driver torque surpasses a damping torque generated in the phase short-circuit operating state. In other words, in this example, switchover to the phase short-circuit operating state is effected directly if the external electrical energy supply does not generate electrical energy in this state and use the electrical energy to charge the electrical energy storage device. This removes the need for continual changeover of the operating state of the motor device to prolong the operational capability of the steering.

In one example, the steering wheel actuator device further has a disconnecting device to interrupt an electrical connection to the electrical energy source at least during aberrant operation. This avoids discharge of the electrical energy storage device via the electrical energy source in the event of a short circuit of the electrical energy source to ground. A disconnecting device of this type can include, for example, a diode circuit.

In a first example of the steering wheel actuator device, a storage capacity of the electrical energy storage device is provided on the basis of an average duration of inactivity phases of the steering wheel. Since the state of charge of the electrical energy storage device depends, at least during aberrant operation, on the rotational movement of the steering wheel, a situation can occur in which too few steering movements charge the energy storage device less quickly than it is discharged by maintaining the steering functionality. In the example described, the storage capacity is provided on the basis of an average duration of an inactivity phase (e.g., a time period without steering movements) in such a way that the probability of the electrical energy storage device being discharged in an inactivity phase is reduced to a low value that is defined as acceptable.

According to a second aspect of the examples disclosed herein, a steer-by-wire steering system for a vehicle includes a steering wheel actuator device according to the first aspect of the examples disclosed herein and an axle actuator device electrically connected to the steering wheel actuator device. According to a third aspect of the examples disclosed herein, a vehicle includes a steer-by-wire steering system according to the second aspect of the examples disclosed herein.

Furthermore, according to a fourth aspect of the examples disclosed herein, a method for operating a steering wheel actuator device for a steer-by-wire steering system of a vehicle, where the steering wheel actuator device has at least one steering wheel angle measuring device to measure a steering wheel angle of a steering wheel, a motor device to generate a motor torque counteracting a driver torque applied to the steering wheel, a control device, and an electrical energy storage device which is chargeable up to a limit value, includes the following:

supplying a steering wheel actuator device with electrical energy at least during normal operation via an electrical energy source connected to the steering wheel actuator device; and supplying at least the at least one steering wheel angle measuring device of the steering wheel actuator device with stored electrical energy via the electrical energy storage device of the steering wheel actuator device during aberrant operation in which the steering wheel actuator device is not supplied with electrical energy by the electrical energy source.

In one example, an example method includes supplying a control device of the steering wheel actuator device with stored electrical energy via the electrical energy storage device of the steering wheel actuator device during aberrant operation in which the steering wheel actuator device is not supplied with electrical energy by the electrical energy source.

In one example, an example method includes:

generating electrical energy via the motor device if the applied driver torque surpasses the motor torque in a generator operating state. In one example, the electrical energy generated in the generator operating state is stored at least partially in the electrical energy storage device if the state of charge of said electrical energy storage device is below the limit value. Alternatively or additionally, in a further example of an example method disclosed herein, electrical energy from the electrical energy source is stored at least partially in the electrical energy storage device during normal operation if the state of charge of said electrical energy storage device is below the limit value.

In another further example, an example method disclosed herein includes a switchover of the motor device during aberrant operation to a phase short-circuit operating state if the state of charge of the electrical energy storage device reaches the limit value. In an alternative example, a changeover of the motor device to a phase short-circuit operating state and a generation of electrical energy can also be directly provided during aberrant operation if the applied driver torque surpasses a damping torque generated in the phase short-circuit operating state.

Moreover, in a further example, an example method disclosed herein includes interrupting an electrical connection to the electrical energy source during aberrant operation.

The advantages and special features of the steering wheel actuator device according to the examples disclosed herein can be implemented in a steer-by-wire steering system, a vehicle and a method for operating a steering wheel actuator device for a steer-by-wire steering system of a vehicle.

Further advantages of the examples disclosed herein are provided in detailed description and figures. The examples disclosed herein in conjunction with the following description of examples with reference to the accompanying figures, in which.

Identical or similar reference signs denote identical or similar elements in the figures, unless otherwise indicated.

Other examples can be used and structural or logical modifications can be made without departing the protective scope of the present examples. The features of the different examples described above and below can obviously be combined with one another, unless specifically indicated otherwise. The description is therefore not to be interpreted in a limiting sense, and the protective scope of the invention is defined by the attached claims.

Figure 1:
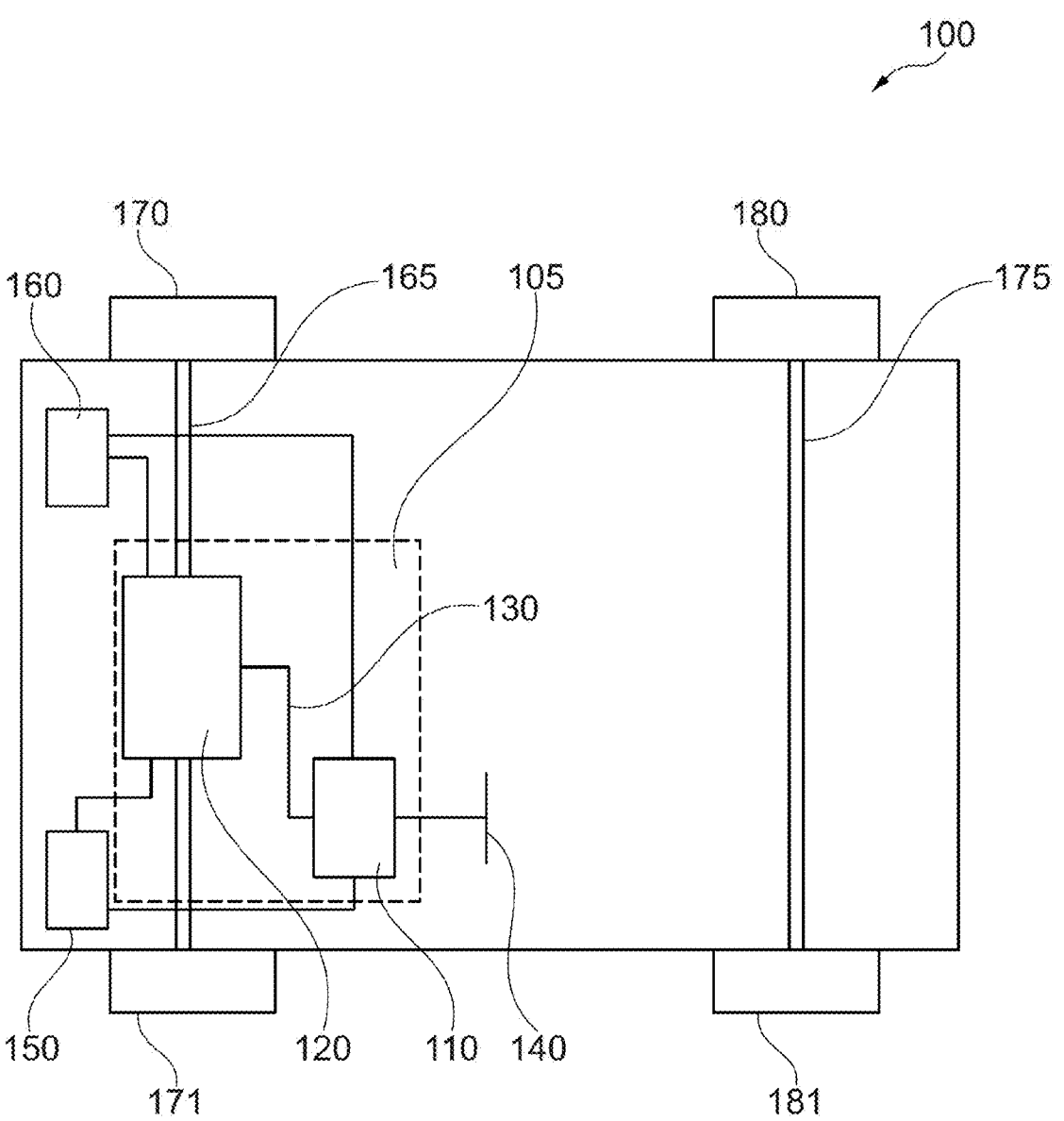
FIG. 1 shows a schematic view of an example of a vehicle having a steer-by-wire steering system with a steering wheel actuator device in accordance with teachings of this disclosure.

FIG. 1 shows a schematic view of an example vehicle 100 having a steer-by-wire steering system 105 with a steering wheel actuator device 110 in accordance with teachings of this disclosure. The steering wheel actuator device 110 is connected via an electrical connection 130 to an axle actuator device 120. The electrical connection 130 enables the exchange of electrical signals and can, for example, be a direct conductive cable connection. However, an electrical connection is also provided, for example, if both the steering wheel actuator device 110 and the axle actuator device 120 are connected via suitable interfaces to an on-board power supply system of the vehicle 100 (e.g., a CAN bus) via which the electrical signals, in particular steering commands or associated steering angle information, are transmitted. The steering wheel actuator device 110 is arranged on the steering wheel 140 of the vehicle 100 to measure a present or current steering wheel angle (e.g., a steering wheel position) and to apply a motor torque counteracting a driver torque applied by the driver to the steering wheel 140. The steering wheel actuator device 110 is coupled or connected to an electrical energy source 150 that supplies the steering wheel actuator device 110 with electrical energy at least during normal operation. In the example shown, the axle actuator device 120 is coupled or connected to the electrical energy source 150.

The axle actuator device 120 is connected to an axle 165 and/or to the steerable, steered wheels 170, 171 of the vehicle 100 in such a way that the steering angle of the wheels 170, 171 can be changed via a suitable mechanism (not shown). The axle actuator device 120 is connected to an electrical energy source 160 to enable operation of the axle actuator device 120. In the example shown, the steering wheel actuator device 110 is coupled or connected to the further electrical energy source 150. The vehicle 100 further has at least one further axle 175 having or supporting two wheels 180, 181.

Figure 2:
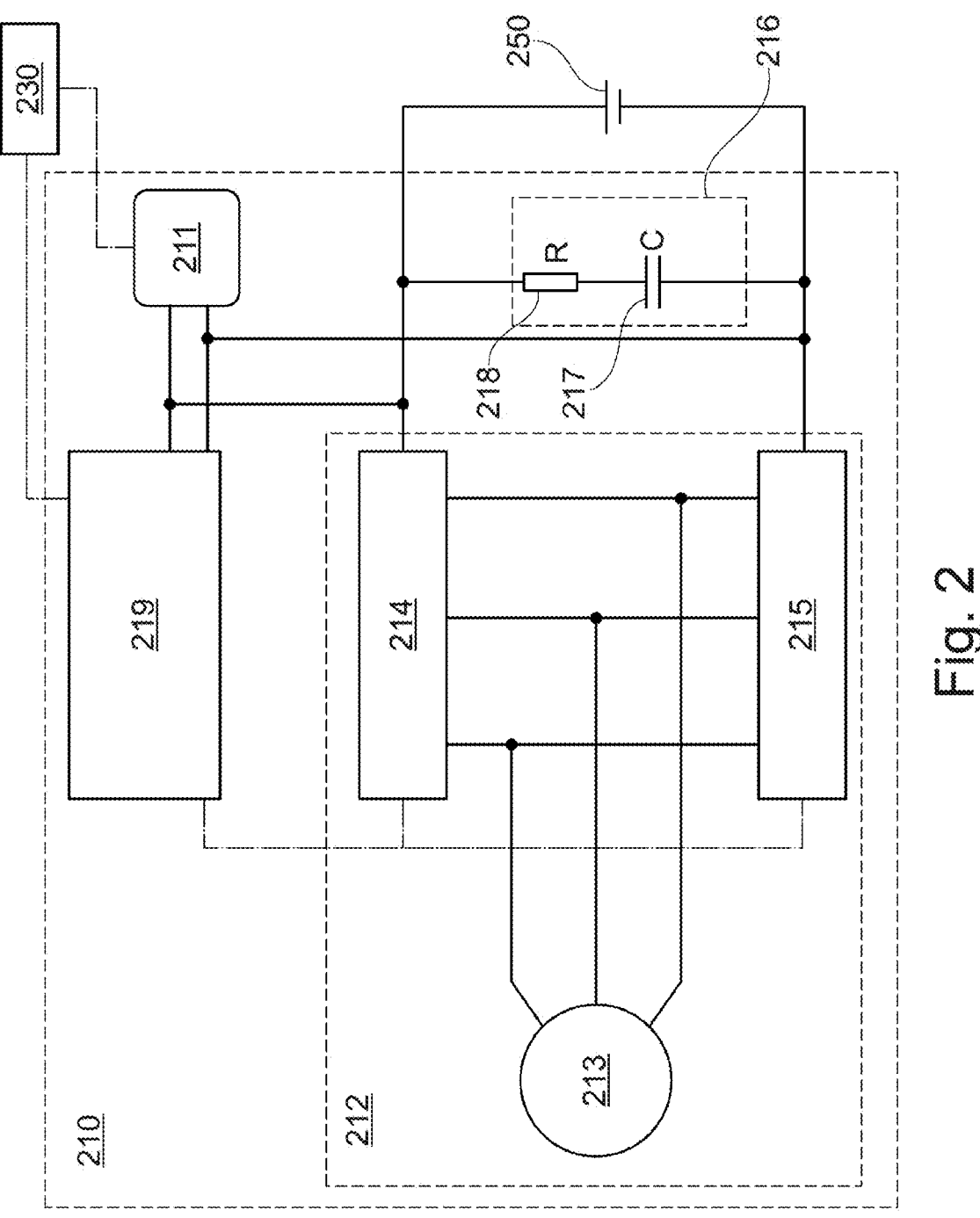
FIG. 2 shows a schematic view of a first example of a steering wheel actuator device for a steer-by-wire steering system disclosed herein.

FIG. 2 shows a schematic view of a first example steering wheel actuator device 210 for a steer-by-wire steering system disclosed herein. The steering wheel actuator device 210 has a steering wheel angle measuring device 211 to measure a steering wheel angle of a steering wheel 140, a motor device 212 to generate a motor torque counteracting a driver torque applied to the steering wheel 140, and a control device 219. In FIG. 2, the steering wheel actuator device 210 is coupled or connected (e.g., electrically coupled) to an electrical energy source 250. This electrical energy source 250 supplies the steering wheel actuator device 210 with electrical energy during normal operation. The steering wheel actuator device 210 has an electrical energy storage device 216 that is chargeable up to a limit value and is configured to supply at least the steering wheel angle measuring device 211 with stored electrical energy during an aberrant operation. For example, an aberrant operation occurs when the steering wheel actuator device 210 is no longer supplied with electrical energy by the electrical energy source 250. In the example shown in FIG. 2, the electrical energy storage device 216 includes a storage capacitor 217 and a resistor 218. In the example shown, the steering wheel angle measuring device 211 is not integrated into the control device 219 but is configured to transmit steering angle information generated on the basis of the measured steering wheel angles via the electrical connection 230 (e.g. an interface to the CAN bus) to an axle actuator device of the steer-by-wire steering system 200. Depending on the configuration of the steering wheel actuator device, there may not be a need during aberrant operation to use energy stored in the electrical energy storage device 216 to activate the control device 219 which can, for example, be an electronic control unit or a different processor.

The motor device 212 has a motor 213 (e.g., an electric motor, for example, a brushless DC motor, etc.). The motor device 212 includes a first switch module 214 and a second switch module 215 to switch the individual phases of the motor 213. The switch modules 214, 215 include activatable semiconductor switching elements. For example, activatable semiconductor switching elements can include for example, but not limited to, deactivated self-conducting or deactivated self-blocking field effect transistors. The control device 219 is configured to transmit activation signals to the switch modules 214, 215 to control an operating state of the motor device 212. In the example shown, during normal operation in which no power supply is provided by the electrical energy source 250, the steering wheel angle measuring device 211 is supplied by the electrical energy storage device 216, whereas the control device 219 remains switched off and the switching modules 214, 215 perform no activation. The deactivated conducting and blocking semiconductor switching elements are switched in such a way that, even without activation signals from the control device 219, the motor device 212 switches to a generator operating state in which a damping torque is generated. In this manner, electrical energy is generated in this state if an applied driver torque surpasses a damping torque generated in the generator operating state so that the electrical energy storage device 216 can be charged on the basis of rotational movements of the steering wheel.

Figure 3:
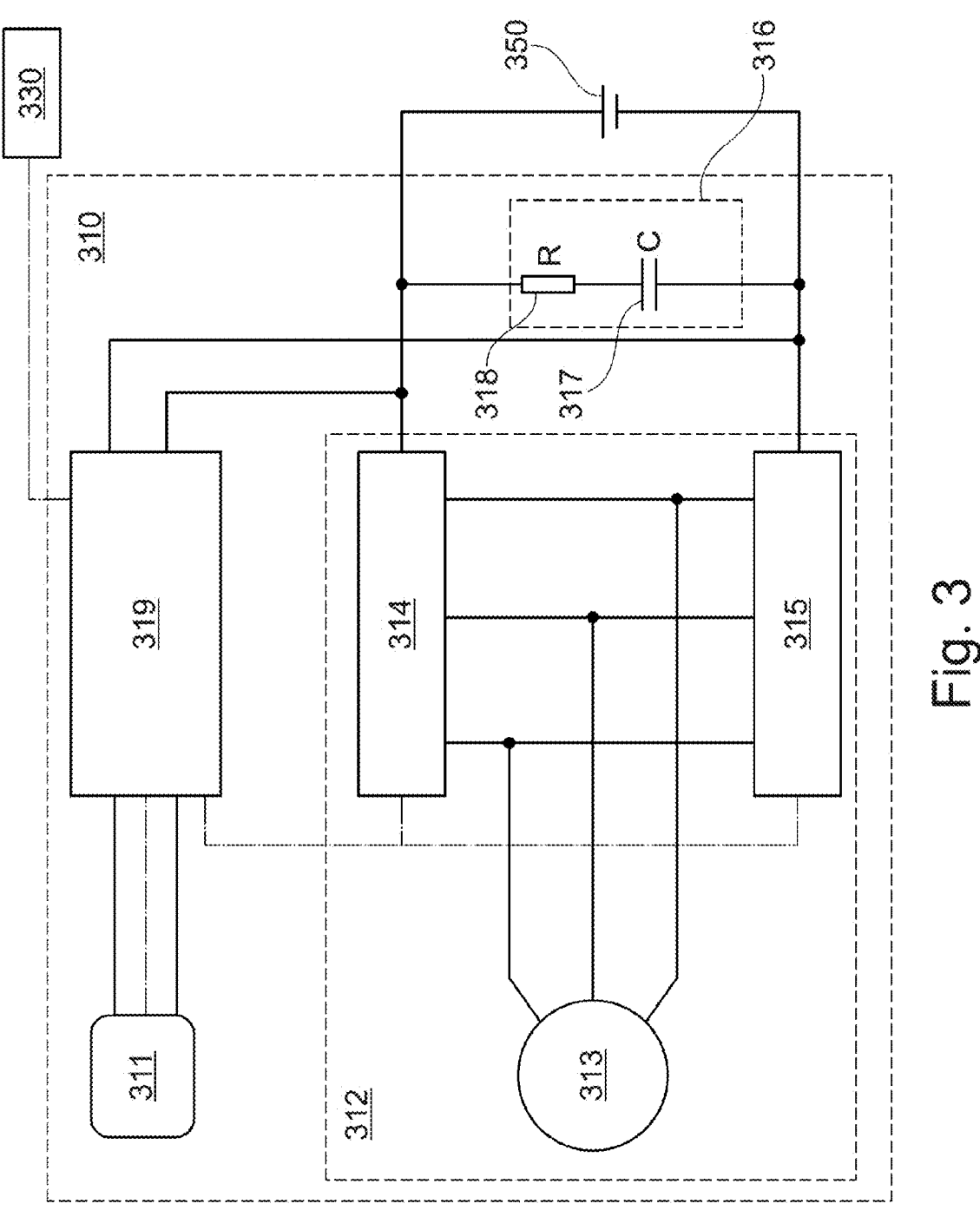
FIG. 3 shows a schematic view of a second example of a steering wheel actuator device for a steer-by-wire steering system disclosed herein.

FIG. 3 shows a schematic illustration of a second example of a steering wheel actuator device 310 for a steer-by-wire steering system described herein. As with the example shown in FIG. 2, the steering wheel actuator device 310 has a steering wheel angle measuring device 311 to measure a steering wheel angle of a steering wheel 140, a motor device 312 to generate a motor torque counteracting a driver torque applied to the steering wheel 140, and a control device 319. In FIG. 3, the steering wheel actuator device 310 is coupled or connected (e.g., electrically coupled) to the electrical energy source 350. This electrical energy source 350 supplies the steering wheel actuator device 310 with electrical energy during normal operation.

The steering wheel actuator device 310 of FIG. 3 has an electrical energy storage device 316 that is chargeable up to a limit value. In the example shown in FIG. 3, the electrical energy storage device 316 has a storage capacitor 317 and a resistor 318.

The electrical energy storage device 316 shown in FIG. 3 is configured or structured to supply the steering wheel angle measuring device 311 and/or the control device 319 with stored electrical energy. Since, the control device 319 in this example remains switched on during aberrant operation (i.e., in the event of aberrant supply from the external electrical energy source 350, the electrical energy source not associated with but connected to the steering wheel actuator device), the steering wheel angle measuring device 311 can be simplified and is integrated into the control device 319, where communication of the generated steering angle information to the axle actuator device of the steer-by-wire steering system is also performed by the control device 319 via an electrical connection 330 (e.g. an interface to a CAN bus).

The motor device 312 shown in FIG. 3 corresponds largely to the motor device 212 shown in FIG. 2 and has a motor 313 (e.g., an electric motor, for example, a brushless DC motor), and a first switch module 314 and a second switch module 315 to switch the individual phases of the motor 313. The switch modules 314, 315 can include activatable semiconductor switching elements.

The control device 319 is configured and/or structured to transmit activation signals to the switch modules 314, 315 to control an operating state of the motor device 312. In the example shown, during normal operation and/or during aberrant operation, the control device 319 activates the switch modules 314, 315 such that the motor device 312 operates in a generator operating state (i.e., electrical energy is generated if the driver torque applied by the driver to the steering wheel surpasses the motor torque). The electrical energy is stored at least partially in the electrical energy storage device 316 if the state of charge of the electrical energy storage device 316 is below or does not exceed a limit value that corresponds, for example, to a maximum storage capacity. If a state of charge of the electrical energy storage device 316 reaches the limit value during aberrant operation, the motor device 312 is configured to switch to a phase short-circuit operating state in which rotational movements of the steering wheel are damped. Since electrical energy is consumed in the phase short-circuit operating state, the state of charge of the electrical energy storage device falls (e.g., slowly) below the limit value. It can then be provided to revert to the generator operating state and recharge the electrical energy storage device 316 until the limit value is reached.

Figure 4:
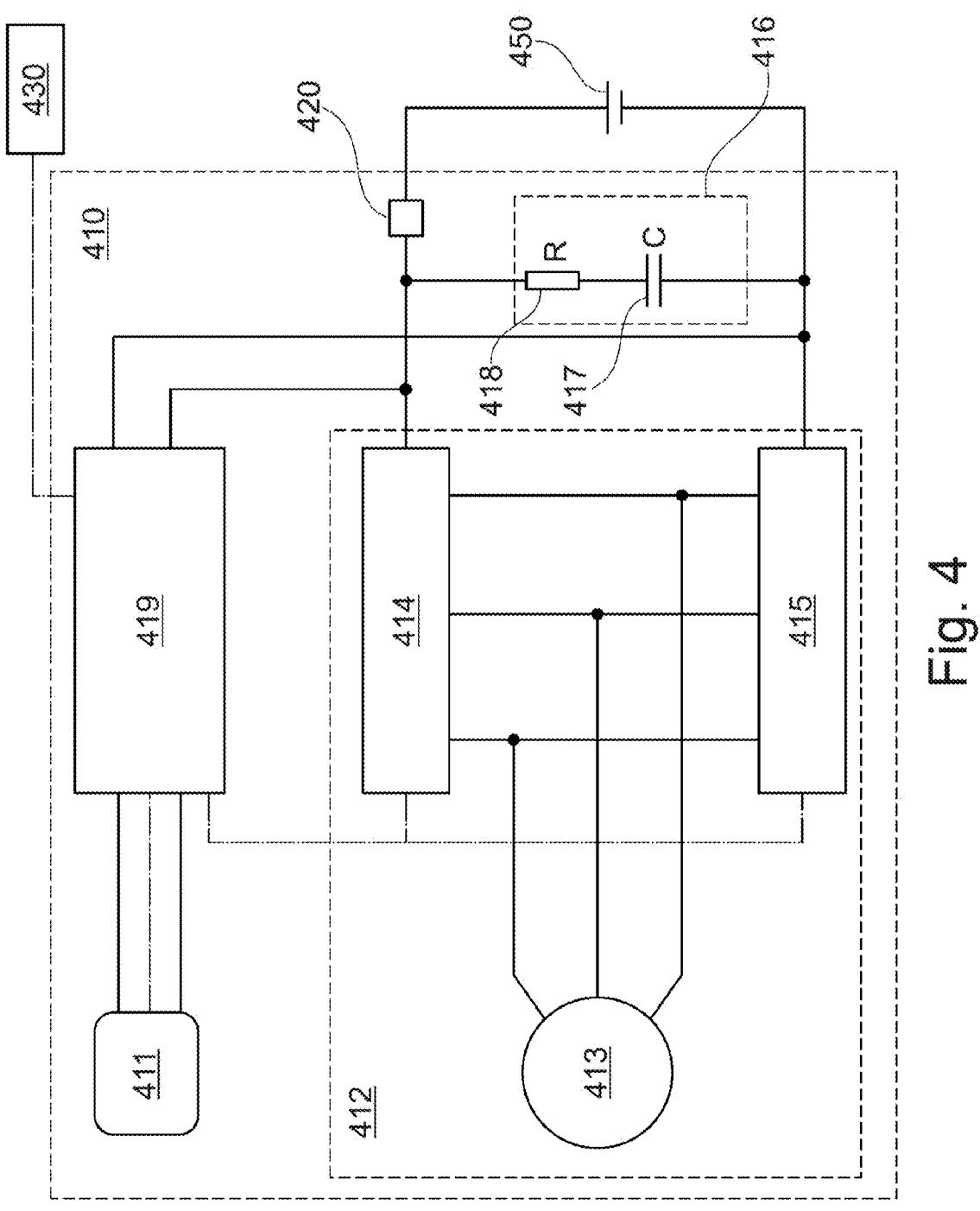
FIG. 4 shows a schematic view of a third example of a steering wheel actuator device for a steer-by-wire steering system disclosed herein.

FIG. 4 shows a schematic view of a third example of a steering wheel actuator device 410 for a steer-by-wire steering system disclosed herein. The example shown corresponds to the example shown in FIG. 3, so that reference is made to the preceding description of FIG. 3 for a detailed explanation of the elements which correspond to one another. In addition, the steering wheel actuator device 410 has a disconnecting device 420 to interrupt an electrical connection to the electrical energy source 450 during aberrant operation. The disconnecting device 420 prevents discharge of the electrical energy storage device 416 via the electrical energy source 450 in the event of a short circuit of the electrical energy source 450 to ground. The disconnecting device 420 is shown in FIG. 4 by way of example with the steering wheel actuator device 410. The example steering wheel actuator device 210 shown in FIG. 2 can include, for example, a disconnecting device to interrupt an electrical connection to the electrical energy source during aberrant operation.

Figure 5:
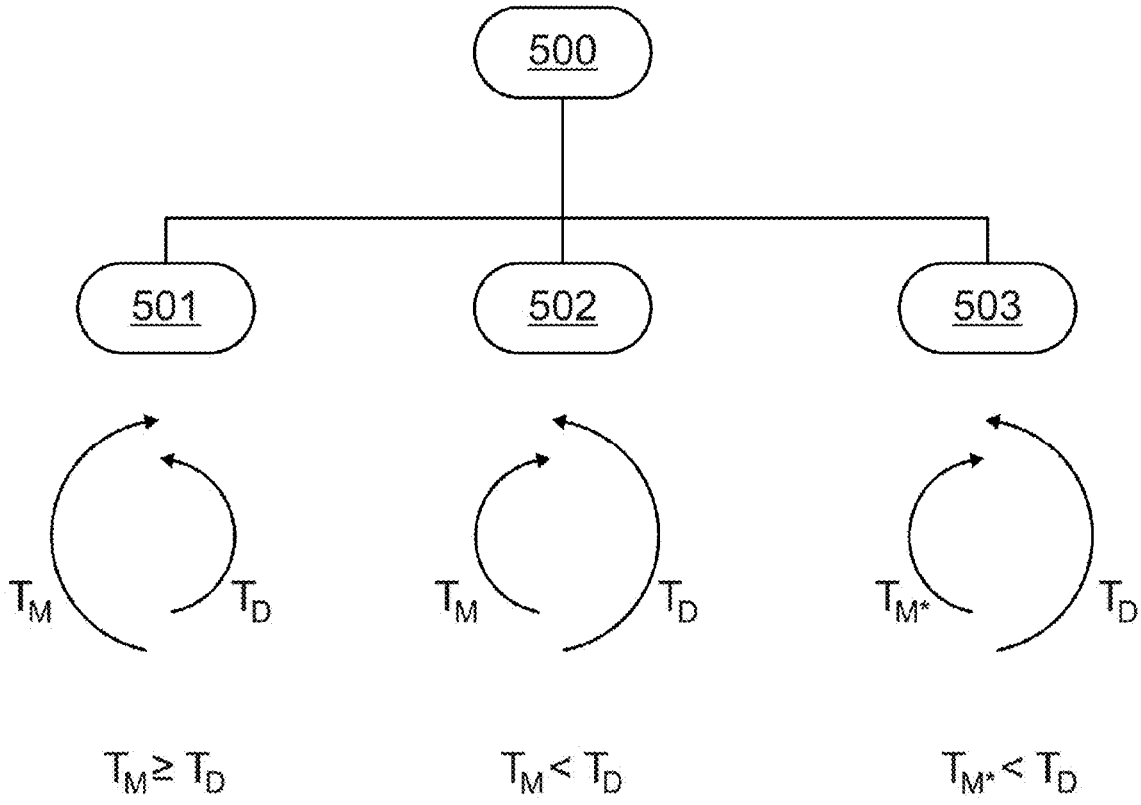
FIG. 5 shows a schematic view of operating states of the motor device during normal operation of the steering wheel actuator device.

FIG. 5 shows a schematic view of different operating states 500 of a motor device (e.g., a motor device during normal operation of a steering wheel actuator device). Normal operation occurs if the steering wheel actuator device is supplied as intended with electrical energy by an external electrical energy source (i.e., an energy source not associated with, but connected to, the steering wheel actuator device, (e.g., a vehicle battery)).

In an active torque operating state 501, the motor is actively prompted by the control device to generate a motor torque $T_M$, which is equal to or greater than a driver torque $T_D$ applied by the driver to the steering wheel 140. Electrical energy is consumed in the motor device in this operating state. This is the case, for example, if a situation is simulated for the driver by the steering wheel actuator device, where one of the steered wheels of the vehicle is blocked through contact with a curbstone and cannot continue to be aligned, as desired.

In a generator operating state 502, the motor torque $T_M$ is surpassed (i.e., exceeded) by the driver torque $T_D$ applied by the driver to the steering wheel 140. In other words, the driver turns the steering wheel 140 against the torque generated by the motor through suitable activation of the switch modules of the motor device by the control device, where the torque is intended to simulate the currently prevailing travel conditions or road conditions, in the direction desired by the driver. In this state, the motor device generates electrical energy according to the principle of a generator. The electrical energy can be either consumed (e.g., directly) or stored in the electrical energy storage device of the steering wheel actuator device.

In a phase short-circuit operating state 503, the phases of the motor are short-circuited by the semiconductor switching elements of the switch modules of the motor device so that the motor acts as an electromagnetic brake if the driver moves the steering wheel 140. The steering wheel movement is damped as a result. It can be provided to enable activation of this fault state actively through corresponding switching of the switch modules, even if the electrical energy source is available. In this state, the driver torque $T_D$ surpasses the damping torque generated by the phase short-circuit (i.e., a passive motor torque $T_{M*}$).

Figure 6:
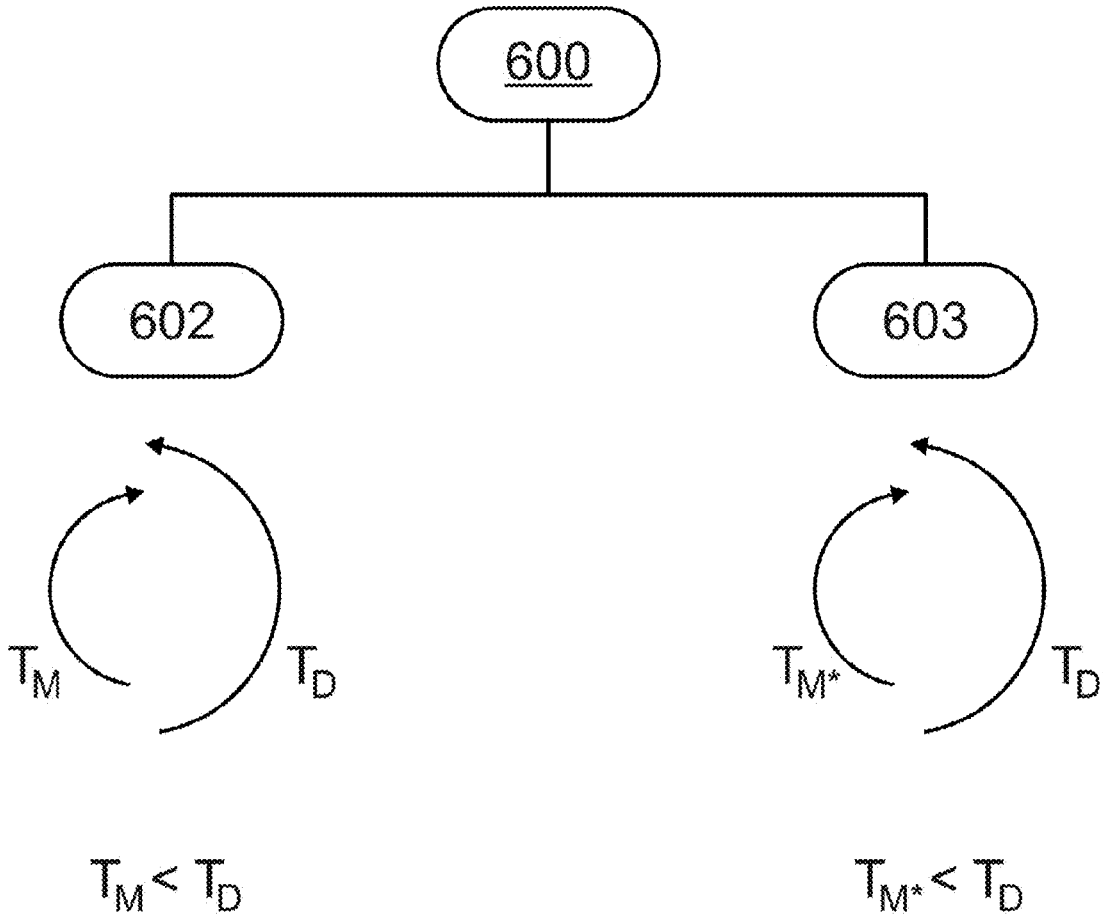
FIG. 6 shows a schematic view of operating states of the motor device during aberrant operation of the steering wheel actuator device.

FIG. 6 shows a schematic view of operating states 600 of the motor device during aberrant operation of the steering wheel actuator device.

Aberrant operation occurs when the steering wheel actuator device is not supplied with electrical energy as intended from an external electrical energy source. For example, an aberrant operation occurs when the electrical energy source is disconnected, switched off or disrupted so that it cannot supply the steering wheel actuator device with electrical energy as normally provided. In this case, the internal electrical energy storage device is configured to supply the steering wheel actuator device or, at least a part thereof (e.g., at least a steering wheel angle measuring device and/or the control device), with electrical energy.

The active torque operating state of the motor device is not available during aberrant operation.

The generator operating state 602 corresponds to the generator operating state 502 during normal operation of the steering wheel actuator device, where the latter generator operating state offers a facility to charge the internal electrical energy storage device during aberrant operation even if the external electrical energy source is not available.

The phase short-circuit operating state 603 corresponds to the phase short-circuit operating state 503 during normal operation. Depending on the example, the phase short-circuit operating state 603 can be activated only if the internal electrical energy storage device is fully charged up to its (e.g., maximum) limit value (i.e., the electrical energy storage device cannot be further charged in the generator operating state 602). Alternatively, the phase short-circuit operating state 603 can be activated prior to the electrical energy storage device being fully charged provided that the motor device is designed to generate electrical energy in the phase short-circuit operating state 603.

Figure 7:
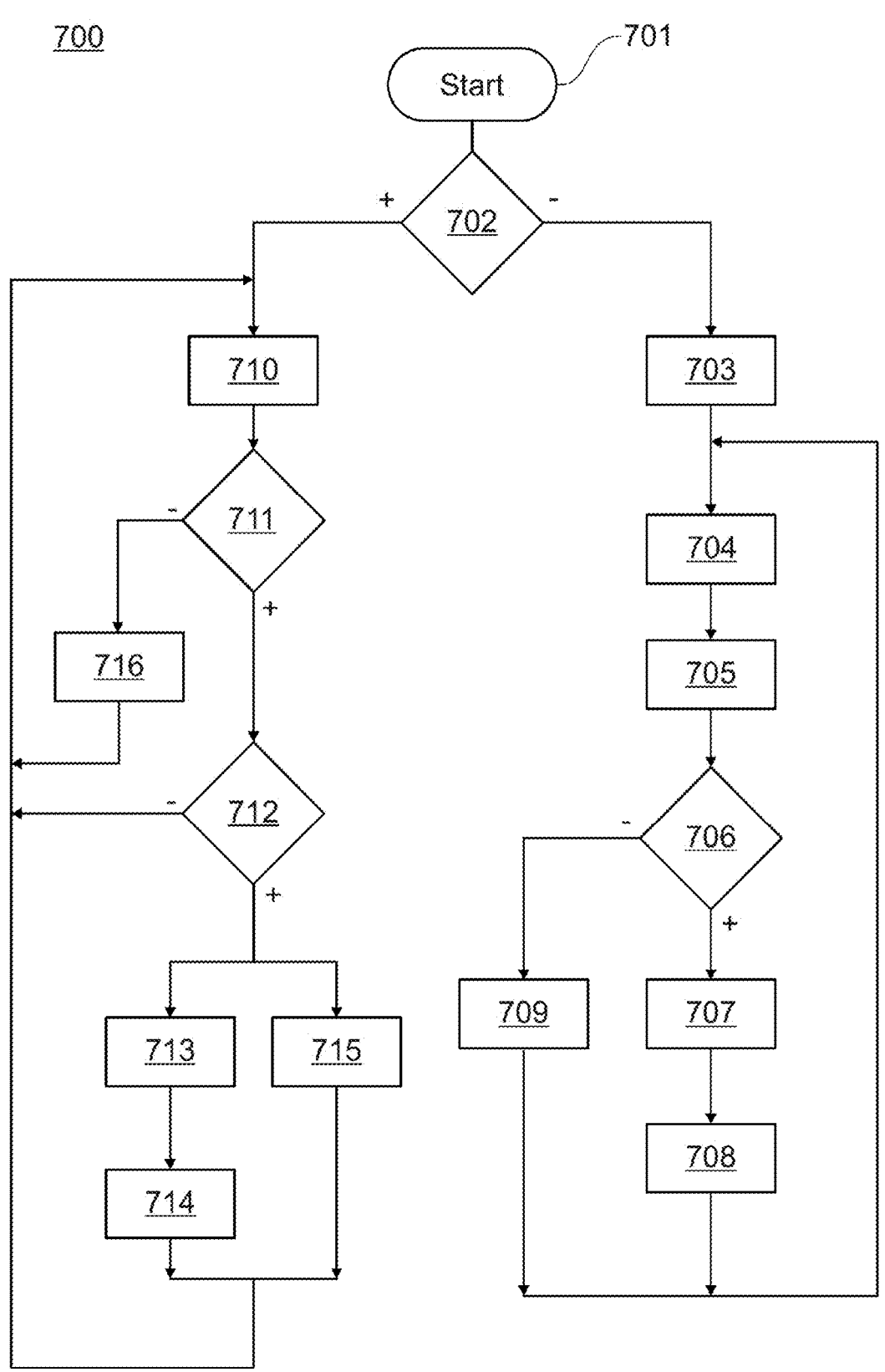
FIG. 7 is a flowchart example machine readable instructions for operating a steering wheel actuator device for a steer-by-wire steering system disclosed herein.

FIG. 7 shows a schematic view of an example of a method 700 for operating a steering wheel actuator device for a steer-by-wire steering system disclosed herein. The method 700 begins in an initial state at block 701, when the steering wheel actuator device is activated. This takes place particularly on start-up of the vehicle having the steer-by-wire steering system with which the steering wheel actuator device is associated. The steering wheel actuator device has at least one steering wheel angle measuring device to measure a steering wheel angle of the steering wheel, a motor device to generate a motor torque $T_M$ counteracting a driver torque $T_D$ applied to a steering wheel, a control device, and an electrical energy storage device that is chargeable up to a limit value G.

At block 702 a check is performed to determine whether an external electrical energy source is supplying the steering wheel actuator device with electrical energy. For example, the check at block 702 can be performed continuously while the method 700 is carried out.

If block 702 reveals that the steering wheel actuator device is not being supplied with electrical energy by an external electrical energy source (indicated by "−" in FIG. 7), then an aberrant operation is taking place. In the example shown, an electrical connection to the electrical energy source is initially interrupted by a disconnecting device (block 703). At least one steering wheel angle measuring device is then supplied (block 704). The control device of the steering wheel actuator device is supplied with stored electrical energy by the electrical energy storage device of the steering wheel actuator device during aberrant operation in which the steering wheel actuator device is not supplied with electrical energy by the electrical energy source (block 705).

A determination is then made of whether a state of charge of the electrical energy storage device is below the limit value G (block 706). If at block 706 the state of charge is determined to be below the limit value G (indicated by "+" in FIG. 7), the motor device switches to a generator operating state and electrical energy is generated by the motor device if the driver torque $T_D$ applied by the driver to the steering wheel surpasses (e.g., exceeds) the motor torque $T_M$ (block 707), followed by a storing of the electrical energy generated in the generator operating state at least partially in the electrical energy storage device (block 708). The method is then continued with the supplying of the steering wheel angle measuring device (block 704).

If at block 706 the state of charge of the electrical energy storage device is determined not to be below the limit value G (indicated by "−" in FIG. 7), the motor device switches to a phase short-circuit operating state during aberrant operation (block 709). The method is then continued here also with the supplying of the steering wheel angle measuring device (block 704).

If it is determined at block 702 that an external electrical energy source is supplying the steering wheel actuator device with electrical energy (indicated by "+" in FIG. 7), it is determined that normal operation of the steering wheel actuator device is taking place.

In this case, the steering wheel actuator device is supplied at least with electrical energy by an electrical energy source connected to the steering wheel actuator device (block 710).

At block 711, the method 700 determines whether a driver torque $T_D$ applied by the driver to the steering wheel is greater than a motor torque $T_M$ generated by the motor device. If at block 711 it is determined that the driver toque $T_D$ applied by the driver to the steering wheel is greater than a motor torque $T_M$ generated by the motor device (indicated by "+" in FIG. 7), the method 700 determines whether the state of charge of the electrical energy storage device is below the limit value G. If at block 712 it is determined that the electrical energy storage device is below the limit value G (indicated by "+" in FIG. 7), the motor device switches to a generator operating state in which electrical energy is generated by the motor device (block 713), followed by a storing of the electrical energy generated in the generator operating state at least partially in the electrical energy storage device (block 714). Electrical energy from the electrical energy source can further be stored during normal operation at least partially in the electrical energy storage device if the state of charge of said electrical energy storage device is below the limit value G (block 715). Electrical energy is supplied to the steering wheel actuator device via the electrical energy source connected to the steering wheel actuator device (block 710).

If at block 712 the state of charge of the electrical energy storage device is determined to be below or does not exceed the limit value G (indicated by "−" in FIG. 7), the steering wheel actuator device is supplied with electrical energy by the electrical energy source connected to the steering wheel actuator device (block 710).

If at block 711 a driver torque $T_D$ applied by the driver to the steering wheel is not greater than a motor torque $T_M$ generated by the motor device (indicated by "−" in FIG. 7), the motor device switches to an active torque operating state (block 716) and the steering wheel actuator device is supplied with electrical energy by the electrical energy source connected to the steering wheel actuator device (block 710). The method 700 ends, for example, when the steering wheel actuator device is switched off, for example, when the vehicle is deactivated.

The sequence differs in other examples of the method. In one example, the generation of electrical energy can also be provided in the phase short-circuit operating state (i.e., a switching of the motor device during aberrant operation to a phase short-circuit operating state and a generation of electrical energy if the applied driver torque surpasses a damping torque generated in the phase short-circuit operating state).

It is noted that this patent claims priority from German Patent Application Number DE 102023122853.6, which was filed on Aug. 25, 2023, and is hereby incorporated by reference in its entirety.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A steering wheel actuator device for a steer-by-wire steering system of a vehicle, comprising:

at least one steering wheel angle measuring device to measure a steering wheel angle of a steering wheel;

a motor device to generate a motor torque counteracting a driver torque applied to the steering wheel;

a control device, wherein the steering wheel actuator device is connectable to an electrical energy source that supplies the steering wheel actuator device with electrical energy; and an electrical energy storage device to supply the at least one steering wheel angle measuring device with stored electrical energy if the steering wheel actuator device is not supplied with electrical energy by the electrical energy source, wherein at least one of:

the motor device is to generate electrical energy if the applied driver torque exceeds the motor torque in a generator operating state;

the motor device is to switch to the generator operating state to generate electrical energy during an aberrant operation if the applied driver torque surpasses a damping torque generated in the generator operating state; or the motor device is to switch to a phase short-circuit operating state at least during an aberrant operation if a state of charge of the electrical energy storage device reaches a limit value.

2. The steering wheel actuator device of claim 1, wherein the electrical energy storage device supplies at least the control device with stored electrical energy during the aberrant operation.

3. The steering wheel actuator device of claim 1, wherein the steering wheel actuator device is to store electrical energy generated during the generator operating state at least partially in the electrical energy storage device if the state of charge of the electrical energy storage device is below the limit value.

4. The steering wheel actuator device of claim 1, wherein the steering wheel actuator device is to store electrical energy from the electrical energy source at least partially in the electrical energy storage device during a normal operation if the state of charge of the electrical energy storage device is below the limit value.

5. The steering wheel actuator device of claim 1, wherein the electrical energy storage device includes at least one of a storage capacitor, a battery, or an accumulator.

6. The steering wheel actuator device of claim 1, wherein the steering wheel actuator device includes a disconnecting device to interrupt an electrical connection to the electrical energy source at least during the aberrant operation.

7. The steering wheel actuator device of claim 1, wherein a storage capacity of the electrical energy storage device is based on an average duration of inactivity phases of the steering wheel.

8. The steering wheel actuator device of claim 1, further including an axle actuator device electrically connected to the steering wheel actuator device.

9. The steering wheel actuator device of claim 8, further including a vehicle having the steer-by-wire steering system.

10. A method for operating a steering wheel actuator device for a steer-by-wire steering system of a vehicle, the steering wheel actuator device having at least one steering wheel angle measuring device to measure a steering wheel angle of a steering wheel, a motor device to generate a motor torque counteracting a driver torque applied to the steering wheel, a control device, and an electrical energy storage device that is chargeable up to a limit value, the method comprising:

supplying the steering wheel actuator device with electrical energy at least during a normal operation via an electrical energy source connected to the steering wheel actuator device;

supplying at least the at least one steering wheel angle measuring device of the steering wheel actuator device with stored electrical energy via the electrical energy storage device of the steering wheel actuator device during an aberrant operation in which the steering wheel actuator device is not supplied with electrical energy by the electrical energy source; and at least one of:

generating electrical energy via the motor device if the applied driver torque surpasses the motor torque in a generator operating state;

switching the motor device to a phase short-circuit operating state during the aberrant operation if a state of charge of the electrical energy storage device reaches the limit value; or switching the motor device to the generator operating state during the aberrant operation and generating electrical energy if the applied driver torque surpasses a damping torque generated in the generator operating state.

11. The method of claim 10, further including supplying the control device of the steering wheel actuator device with stored electrical energy via the electrical energy storage device of the steering wheel actuator device during the aberrant operation in which the steering wheel actuator device is not supplied with electrical energy by the electrical energy source.

12. The method of claim 10, further including storing the electrical energy generated during the generator operating state at least partially in the electrical energy storage device if the state of charge of the electrical energy storage device is below the limit value.

13. The method of claim 10, further including storing energy from the electrical energy source at least partially in the electrical energy storage device during the normal operation if the state of charge of the electrical energy storage device is below the limit value.

14. The method of claim 10, further including interrupting an electrical connection to the electrical energy source during the aberrant operation.

15. A steering wheel actuator device for a steer-by-wire steering system of a vehicle, comprising:

at least one steering wheel angle measuring device to measure a steering wheel angle of a steering wheel;

a motor device to generate a motor torque counteracting a driver torque applied to the steering wheel;

a control device, wherein the steering wheel actuator device is connectable to an electrical energy source that supplies the steering wheel actuator device with electrical energy; and an electrical energy storage device to supply the at least one steering wheel angle measuring device with stored electrical energy if the steering wheel actuator device is not supplied with electrical energy by the electrical energy source, wherein the steering wheel actuator device is to store electrical energy from the electrical energy source at least partially in the electrical energy storage device during a normal operation if a state of charge of the electrical energy storage device is below a limit value.

16. The steering wheel actuator device of claim 15, wherein the motor device is to generate electrical energy if the applied driver torque exceeds the motor torque in a generator operating state.

17. The steering wheel actuator device of claim 15, wherein the motor device is to switch to a phase short-circuit operating state at least during an aberrant operation if a state of charge of the electrical energy storage device reaches the limit value.

18. The steering wheel actuator device of claim 15, wherein the motor device is to switch to a generator operating state to generate electrical energy during an aberrant operation if the applied driver torque surpasses a damping torque generated in the generator operating state.

* * * * *